US011927333B2

(12) United States Patent
Dai et al.

(10) Patent No.: US 11,927,333 B2
(45) Date of Patent: Mar. 12, 2024

(54) LIGHTING LAMP

(71) Applicant: Shenzhen Intellirocks Tech. Co., Ltd., Shenzhen (CN)

(72) Inventors: Jun Dai, Shenzhen (CN); Wenlong Wu, Shenzhen (CN)

(73) Assignee: SHENZHEN INTELLIROCKS TECH. CO., LTD., Shenzhen (CN)

( * ) Notice: Subject to any disclaimer, the term of this patent is extended or adjusted under 35 U.S.C. 154(b) by 0 days.

(21) Appl. No.: 18/336,842

(22) Filed: Jun. 16, 2023

(65) Prior Publication Data

US 2023/0408075 A1 Dec. 21, 2023

(30) Foreign Application Priority Data

Jun. 20, 2022 (CN) ......................... 202210700925.1
Jul. 6, 2022 (CN) ......................... 202221762672.2

(51) Int. Cl.

*F21V 23/00* (2015.01)
*F21V 15/01* (2006.01)
*F21V 17/06* (2006.01)
*F21V 31/00* (2006.01)
*F21Y 113/00* (2016.01)

(52) U.S. Cl.

CPC ............ *F21V 23/006* (2013.01); *F21V 15/01* (2013.01); *F21V 17/06* (2013.01); *F21V 23/002* (2013.01); *F21V 31/005* (2013.01); *F21Y 2113/00* (2013.01)

(58) Field of Classification Search

CPC ...... F21V 23/006; F21V 23/002; F21V 15/01; F21V 17/06; F21V 31/005

See application file for complete search history.

(56) References Cited

U.S. PATENT DOCUMENTS 5,642,933 A * 7/1997 Hitora ..................... F21S 8/083 362/348
6,135,612 A * 10/2000 Clore ...................... F21K 9/232 362/244
7,442,125 B2 * 10/2008 Paulsen ............... G07F 17/3202 463/30
7,445,360 B2 * 11/2008 Ikeda ........................ F21V 5/04 362/555
7,677,761 B2 * 3/2010 Chiang ..................... F21K 9/00 362/240

(Continued)

*Primary Examiner* — Arman B Fallahkhair

(74) *Attorney, Agent, or Firm* — KIP Legal Services, PLLC

(57) ABSTRACT

A lighting lamp includes a first lamp-assembly structure, at least one second lamp-assembly structure, and a control structure. The first lamp-assembly structure includes a first lamp body and a first lamp column used to scatter light generated by the first lamp body. A first end of the first lamp column is fixedly connected with a first end of the first lamp body. The second lamp-assembly structure includes a second lamp body, a first end of the second lamp body being connected to a second end of the first lamp column, and a second lamp column fixedly connected to a second end of the second lamp body and used to scatter the light generated by the second lamp body. The control structure is arranged in the first lamp body and/or the second lamp body, and is electrically connected with the first lamp body and the second lamp body.

15 Claims, 11 Drawing Sheets

(56) References Cited

U.S. PATENT DOCUMENTS

| | | | | |
|---|---|---|---|---|
| 7,705,745 | B2 * | 4/2010 | Periot | F21V 23/06<br>116/63 P |
| 7,722,215 | B2 * | 5/2010 | Ward | F21K 9/00<br>362/249.02 |
| 7,880,637 | B2 * | 2/2011 | Weiss | G08B 5/36<br>362/240 |
| 8,395,526 | B2 * | 3/2013 | Kensy | G08B 5/36<br>340/815.73 |
| 8,456,322 | B2 * | 6/2013 | Marquardt | G08B 5/36<br>340/815.73 |
| 9,175,827 | B2 * | 11/2015 | Clore | F21V 5/04 |
| 9,689,544 | B2 * | 6/2017 | Green, Jr. | F21V 23/006 |
| 9,997,031 | B2 * | 6/2018 | Dolezalek | G08B 7/06 |
| 10,309,594 | B1 * | 6/2019 | Baldwin | F21V 23/06 |
| 10,475,299 | B2 * | 11/2019 | Dolezalek | G08B 21/18 |
| 10,984,636 | B2 * | 4/2021 | Dolezalek | G08B 5/38 |
| 2011/0103050 | A1 * | 5/2011 | Hochman | F21K 9/00<br>264/261 |
| 2014/0071681 | A1 * | 3/2014 | Ghafoori | F21V 23/0464<br>362/249.14 |
| 2015/0198317 | A1 * | 7/2015 | Feller | F21S 2/005<br>362/382 |

* cited by examiner

LIGHTING LAMP

CROSS-REFERENCES TO RELATED APPLICATIONS

This application claims priority to Chinese Patent Application No. CN202210700925.1, filed on Jun. 20, 2022, and Chinese Patent Application No. CN202221762672.2, filed on Jul. 6, 2022, the content of all of which is hereby incorporated by reference in entirety.

FIELD OF THE TECHNOLOGY

The present disclosure relates to the technical field of lighting technology and, in particular, to a lighting lamp.

BACKGROUND OF THE DISCLOSURE

Currently, with the development of the economy, lighting lamps can be seen everywhere in people's daily lives. Lighting lamps are lamps that provide lighting functions, and lighting lamps are widely used in various places that need lighting.

For lawn lamps and path lamps used in urban slow lanes, narrow lanes, residential areas, tourist attractions, parks, squares, private gardens, courtyard corridors and other public places, generally the light-emitting part on the top of the lamp is also used to scatter light to the surrounding environment. Such lighting lamps only emit light from the top and have a monolithic structure, and cannot expand the lamp component structures. Further, the core of the emerging LED lighting lamps is the LED light-emitting device, which has strict requirements on temperature and, within a proper temperature range, has a good operation state and a high photoelectric conversion rate. However, it is often easy for the heat generated by the existing lighting lamps to concentrate, and the resulting heat dissipation effect is often poor, causing low luminous efficiency and poor lighting effect.

The disclosed methods and apparatus are directed to solve one or more problems set forth above and other problems.

SUMMARY

The present disclosure provides a lighting lamp to solve the problem of single structure of the existing lighting lamp, to increase the luminous efficiency of the lighting lamp, and to improve the lighting effect.

According to one aspect of the present disclosure, a lighting lamp is provided. The lighting lamp includes a first lamp-assembly structure, at least one second lamp-assembly structure, and a control structure. The first lamp-assembly structure includes a first lamp body having a first end and a second end arranged opposite to each other, and a first lamp column used to scatter light generated by the first lamp body and having a first end and a second end arranged opposite to each other. The first end of the first lamp column is fixedly connected with the first end of the first lamp body. The second lamp-assembly structure includes a second lamp body having a first end and a second end arranged opposite to each other, the first end of the second lamp body being connected to the second end of the first lamp column, and a second lamp column fixedly connected to the second end of the second lamp body and used to scatter the light generated by the second lamp body. The control structure is arranged in the first lamp body and/or the second lamp body, and is electrically connected with the first lamp body and the second lamp body, and is used to control the first lamp body and the second lamp body to emit light.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

DETAILED DESCRIPTION

Figure 1:
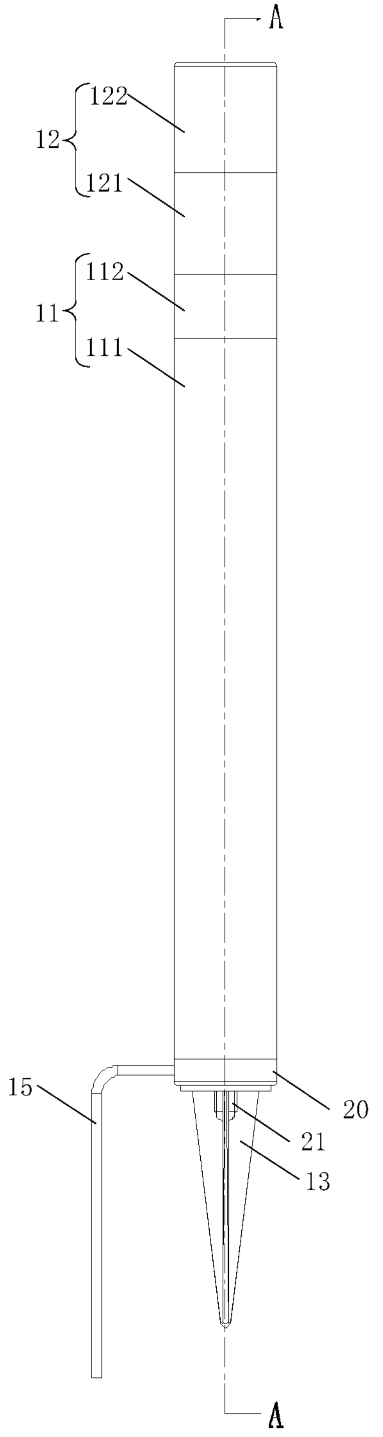
FIG. 1 illustrates a schematic diagram of a lighting lamp according to an embodiment of the present disclosure.

The following describes exemplary embodiments in detail, and examples of the embodiments are shown in the accompanying drawings, so as to better understand the present disclosure. Unless otherwise specified, a same number in different drawings may represent a same or similar element. The implementations described in the disclosed embodiments below do not represent all implementations consistent with the present disclosure, but are merely examples of the apparatus and the methods that are consistent with some aspects of the present disclosure, and should not be used for limiting the present disclosure. Further, as long as there is no conflict, the embodiments of the present disclosure and features of the embodiments may be combined with each other.

In the description of the embodiments of this disclosure, it should be noted that unless otherwise specified and limited, the terms “coupled” and “connected” should be understood in a broad sense. For example, it can be a fixed connection or a detachable connection, or an integrated connection; it can be a mechanical connection or an electrical connection; it can be a direct connection or an indirect connection through an intermediary. Those of ordinary skill in the art can understand the specific meanings of the above terms in the embodiments of the present application in specific situations.

In the embodiment of the present application, unless otherwise clearly specified and limited, a first feature being “above” or “below” a second feature can mean that the first feature is in direct contact with the second feature, or the first feature is in indirect contact with the second feature through an intermediate medium. Moreover, the first feature being “over”, “above” and “up” the second feature can mean that the first feature is directly above or obliquely above the second feature, or simply means that the first feature is higher in level than the second feature. The first feature being “under”, “below” and “down” the second feature can mean that the first feature is directly below or obliquely below the second feature, or simply means that the first feature is lower in level than the second feature.

In the description of this specification, descriptions referring to the terms “one embodiment”, “some embodiments”, “example”, “specific examples”, or “some examples” mean that the described specific features, structures, materials or characteristics are included in at least one embodiment or example of the embodiments of the present disclosure. In this specification, the schematic representations of the above terms are not necessarily directed to the same embodiment or example. Furthermore, the described specific features, structures, materials or characteristics may be combined in any suitable manner in any one or more embodiments or examples. In addition, those skilled in the art can combine different embodiments or examples and/or combine features of different embodiments or examples described in this specification without conflicting with each other.

The lighting lamp provided by the present disclosure will be described in detail below together with accompanying drawings.

As shown in FIGS. 1 to 4, FIGS. 6 to 10, and FIGS. 12 to 14, a lighting lamp is provided. The lighting lamp may include: a first lamp-assembly structure 11, a second lamp-assembly structure 12, and a control structure (not labeled). The first lamp-assembly structure 11 includes a first lamp body 111 and a first lamp column 112. The first lamp body 111 is provided with a first end and a second end oppositely arranged with each other, and the first lamp column 112 is provided with a first end and a second end oppositely arranged with each other. The first end of the first lamp column 112 is fixedly connected with the first end of the first lamp body 111, and the first lamp column 112 is used to scatter the light generated by the first lamp body 111.

The second lamp-assembly structure 12 includes a second lamp body 121 and a second lamp column 122. The second lamp body 121 is provided with a first end and a second end arranged opposite to each other. The first end of the second lamp body 121 is connected to the second end of the first lamp column 112. The second lamp column 122 is fixedly connected with the second end of the second lamp body 121, and is used to scatter the light generated by the second lamp body 121. The control structure is set in the first lamp body 111 and/or the second lamp body 121, and is electrically connected with the first lamp body 111 and the second lamp body 121 respectively, and is used to control the first lamp body 111 and the second lamp body to emit light.

The lighting lamp provided by this disclosure can be a streetlamp installed on the side of the road to provide road lighting, a lawn lamp installed on the lawn, or a lighting lamp installed in other lighting places, which is not specifically limited. The control structure can be an integrated control chip such as an MCU (microcontroller unit), or a non-integrated control circuit, etc. In certain embodiments, the carrier for carrying the lighting lamp can be the ground. In certain other embodiments, the carrier can also be a wall or the like.

Accordingly, the lighting lamp at least includes a first lamp-assembly structure 11, a second lamp-assembly structure 12, and a control structure for controlling the first lamp-assembly structure 11 and the second lamp-assembly structure 12. The control structure controls the first lamp body 111 and the second lamp body 111 to emit light, realizing the lighting effect of the lighting lamp. Further, the first lamp column 112 is disposed between the first lamp body 111 and the second lamp body 121, causing the first lamp body 111 and the second lamp body 121 being separately located, improving the heat concentration problem of the first lamp body 111 and the second lamp body 121, improving the heat dissipation effect, thereby improving the luminous efficiency of the first lamp body 111 and the second lamp body 121, and further increasing the overall luminous efficiency of the lighting lamp, improving the lighting effect. Further, the first lamp-assembly structure 11 and the second lamp-assembly structure 12 may be stacked and, compared with the existing lighting lamp with a single top structure, the complexity of the lighting lamp structure and the flexibility of expansion can be increased.

Further, the first lamp-assembly structure 11 and the second lamp-assembly structure 12 are arranged in layers or stacked, avoiding increasing the diameter of the lighting lamp, that is, the dimension perpendicular to the carrier. Therefore, such arrangements can increase the luminous efficiency of the lighting lamp and improve the lighting effect, under the premise of ensuring the same diameter of the lighting lamp. In one embodiment, the light generated by the first lamp body 111 is diffused by the first lamp column 112, and the light generated by the second lamp body 121 is diffused by the second lamp column 122, which can improve the uniformity of the light of the lighting lamp and expand the irradiation angle of the light.

Further, in certain embodiments, the first lamp body 111 and the second lamp body 121 may be each integrated with a light-emitting element (not shown), and the control structure is electrically connected with the light-emitting element to control the light-emitting element to emit light, so as to realize the light emission of the first lamp body 111 and the second lamp body 121. The first lamp body 111 guides the light of its light-emitting element into the first lamp column 112, so that the first lamp column 112 performs uniform light scattering treatment on the light generated by the first lamp body 111; the second lamp body 121 guides the light of its light-emitting element into the second lamp column 122, so that the second lamp column 122 performs uniform light scattering treatment on the light generated by the second lamp body 121.

In certain embodiments, the first lamp column 112 and the second lamp column 122 may be light-transmitting or translucent, and arranged in a columnar shape, and their side surfaces can scatter light at 360°, so that the effect of uniform lighting in 360° can be achieved.

In certain embodiments, the light-emitting surfaces of the first lamp column 112 and the second lamp column 122 can be frosted surfaces, which will not affect the lighting effect, and can improve the softness of light. In certain other embodiments, the light-emitting surfaces of the first lamp column and the second lamp column may also be smooth surfaces or the like.

In certain embodiments, the light-emitting surface of the lamp column (the first lamp column 112 and/or the second lamp column 122) might not be 360°. For example, multiple light-emitting surfaces may be separately provided on the side surfaces of the lamp column, and each light-emitting surface can have a light-emitting angle, such as 30°, 60°, or 90°, etc. Alternatively, only one light-emitting surface may be provided on the side surface of the lamp column, and the light-emitting surface can have a light-emitting angle of 120° or 180°. Of course, the light-emitting surface of the lamp column can also have other different light-emitting angles.

In certain embodiments, the first lamp body 111 and the second lamp body 121 are provided in a column shape, and the first lamp body 111, the first lamp column 112, the second lamp body 121, and the second lamp column 122 are arranged coaxially. In this way, the lighting effect and light utilization efficiency can be ensured, and the volume of the lighting lamp can be reduced.

In certain embodiments, the column shape may include a cylindrical shape, a square column shape, and the like. In certain other embodiments, the first lamp body and the second lamp body may be in a non-columnar shape, for example, a funnel shape, a plate shape, and the like.

In certain embodiments, as shown in FIGS. 1 to 4 and FIGS. 13 to 14, the lighting lamp may further include a fixing member 13. The fixing member 13 may be fixedly connected to the second end of the first lamp body 111, for fixing the first lamp body 111 to the carrier carrying the lighting lamp. In one embodiment, the lighting lamp is fixed to the carrier through the fixing member 13, which can ensure the stability of the lighting lamp.

In one embodiment, based on the application scenario of the lighting lamp, the first lamp column 112 is vertically or obliquely fixed on the carrier through the fixing member 13.

In one application scenario, the lighting lamp can be a lawn lamp, and the first lamp column 112 of the lawn lamp is vertically fixed on the grass through its fixing member 13. In another application scenario, the lighting lamp can be a wall lamp, and the first lamp column 112 of the wall lamp is obliquely fixed on the vertical wall through the fixing member 13, that is, the axial direction of the first lamp column 112 forms a certain angle with the vertical wall.

In certain embodiments, as shown in FIG. 2, FIG. 7, and FIG. 10 to FIG. 11, the control structure includes a first control member 141 and a second control member 142. The first control member 141 is arranged inside the first lamp body 111, and is electrically connected to the first lamp body 111 for controlling the first lamp body 111 to emit light. The second control member 142 is arranged inside the second lamp body 121 and is electrically connected to the second lamp body 121 for controlling the second lamp body 121 to emit light.

Specifically, the first control member 141 may be fixedly arranged in the first end of the first lamp body 111; and the second control member 142 may be fixedly arranged in an end of the second lamp body 121 close to the second lamp column 122.

Specifically, the first control member 141 is electrically connected to the light-emitting element in the first lamp body 111 to control the light-emitting element to emit light; the second control member 142 is electrically connected to the light-emitting element in the second lamp body 121 to control the light-emitting element to emit light.

Because the first control member 141 controls the first lamp body 111 to emit light, and the first lamp column 112 scatters the light emitted by the first lamp body 111, by arranging the first control member 141 on the top of the first end of the first lamp body 111, not only it can shorten the control path of the first control member 141, but also it does not affect the scattering effect of the first lamp column 112.

Because the second control member 142 controls the second lamp body 121 to emit light, and the second lamp column 122 scatters the light emitted by the second lamp body 121, by arranging the second control member 142 on the top of the end of the second lamp body 121 close to the second lamp column 122, not only it can shorten the control path of the second control member 142, but also it does not affect the scattering effect of the second lamp column 122.

The first end of the first lamp column 112 may be provided with a connecting portion (not shown) connected to the first lamp body 111, and the connecting portion is located at the first end of the first lamp column 112. In certain embodiments, the first control member 141 can also be fixedly arranged in the connecting portion. Since the connecting portion is generally designed to be light-tight, this structure will not affect the scattering effect of the first lamp column 112. Similar modifications can also be made to the second lamp column 122 and the second control member 142.

In certain embodiments, the first control member 141 and the second control member 142 may be circuit boards, such as printed circuit boards (PCB), blank PCB boards and the like. Of course, it may also be an independent switching device or the like. The light emitting elements can be integrated on the corresponding circuit boards.

The first control member 141 controls the first lamp body 111 to emit light and the second control member 142 controls the second lamp body 121 to emit light, which may be performed synchronously or asynchronously. For example, when the first control member 141 controls the first lamp body 111 to emit light, the second control member 142 controls the second lamp body 121 to emit light at the same time. For another example, when the first control member 141 controls the first lamp body 111 to emit light, the second control member 142 controls the second lamp body 121 not to emit light. For another example, when the first control member 141 controls the first lamp body 111 not to emit light, the second control member 142 controls the second lamp body 121 to emit light.

In one embodiment, the first control member 141 for controlling the light emission of the first lamp body 111 and the second control member 142 for controlling the light emission of the second lamp body 121 are arranged separately, which can improve the heat dissipation effect of the lighting lamp. By arranging the first control member 141 inside the first lamp body 111, and arranging the second control member 142 inside the second lamp body 121, it can protect the first control member 141 and the second control member 142, avoiding control failures and ensuring the normal lighting operation of the lighting lamp.

In certain other embodiments, only one control member may be provided to simultaneously control the first lamp body and the second lamp body.

In certain embodiments, the control structure further includes a driving member 143. The driving member 143 may be arranged inside the first lamp body 111 and is electrically connected to the first control member 141 and the second control member 142, for respectively driving the first control member 143 and the second control member 142 to operate. In one embodiment, the driving member 143 is fixed in the first lamp body 111 by glue.

The first control member 141 may be disposed inside the first end of the first lamp body 111 to be spaced from the driving member 143, so as to increase the heat dissipation or cooling effect.

In one embodiment, the length of the first lamp body 111 is longer than that of the second lamp body 121 to accommodate the first control member 141 and the driving member 143, which are arranged separately at an interval. The driving member 143 may be a circuit board, such as a PCB board, a blank PCB board, and the like.

In certain embodiments, by arranging the driving member 143 inside the first lamp body 111, it can protect the driving member 143, avoiding control failures and ensuring the normal lighting operation of the lighting lamp. Further, the electrical signal for controlling the driving member 143 is usually obtained from the bottom of the lighting lamp and, thus, the transmission path of the electrical signal can be shortened and signal interference can be reduced. In certain other embodiments, the driving member 143 can also be arranged inside the second lamp body.

In one embodiment, each circuit board is placed separately, which can effectively avoid heat stacking and increase product reliability.

In various application scenarios, the driving member can independently drive the first control member or the second control member, or drive the first control member and the second control member at the same time. The luminous power of the first lamp body by first control member may be the same as the luminous power of the second lamp body by second control member, or the luminous power of the first lamp body by first control member may be different from the luminous power of the second lamp body by second control member.

Further, as shown in FIG. 2, FIG. 6 to FIG. 14, the lighting lamp may further include a first wire 15. A first end of the first wire 15 may be embedded in the first lamp body 111 and is electrically connected with the driving member 143, and a second end of the first wire 15 may extend from the second end of the first lamp body 111 to the outside of the first lamp body 111 and is electrically connected to the power supply device of the lighting lamp. The peripheral power supply device may be used to provide power and control signals to the driving member 143.

Optionally, the lighting lamp may further include a second wire 16. The second wire 16 may be disposed inside the first lamp body 111, a first end of the second wire 16 is electrically connected to the driving member 143, and a second end of the second wire 16 is electrically connected with the first control member 141 to realize the electrical connection between the driving member 143 and the first control member 141 through the second wire 16.

Optionally, the lighting lamp may further include a third wire 17. A first end of the third wire 17 is arranged inside the first lamp body 111 and is electrically connected to the driving member 143, and the other end of the third wire 17 extends from the first lamp body 111 to the second lamp body 121, and is electrically connected to the second control member 142 so as to realize the electrical connection between the driving member 143 and the second control member 142 through the third wire 17.

Optionally, the first lamp body 111 may be provided with a carrying portion (not shown). The first control member 141 may be fixed on the carrying portion, and both the carrying portion and the first control member 141 may be provided with through holes for wiring.

Specifically, the first control member 141 is fixed on a side of the carrying portion that is close to the first lamp column 112, and the first control member 141 can be fixed on the carrying portion by screws 18 (as shown in Figure). In other embodiments, the first control member can also be fixed on the carrying portion or inside the lamp body by means of dispensing glue or the like.

Further, the first control member 141 and the second control member 142 may be provided with connection terminals, and the first control member 141 and the second control member 142 are respectively connected to corresponding wires through corresponding connection terminals.

Figure 2:
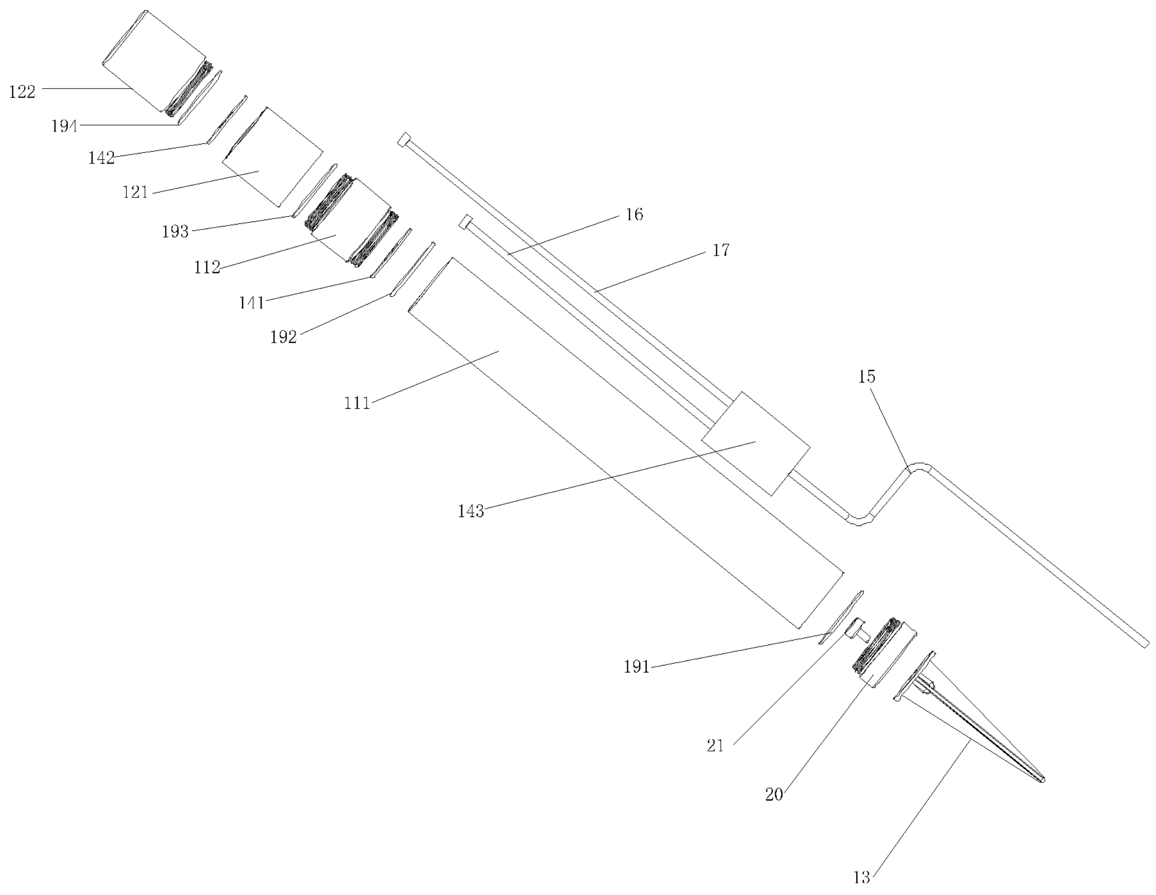
FIG. 2 illustrates a schematic diagram of an explosive view of the lighting lamp in FIG. 1.
Figure 3:
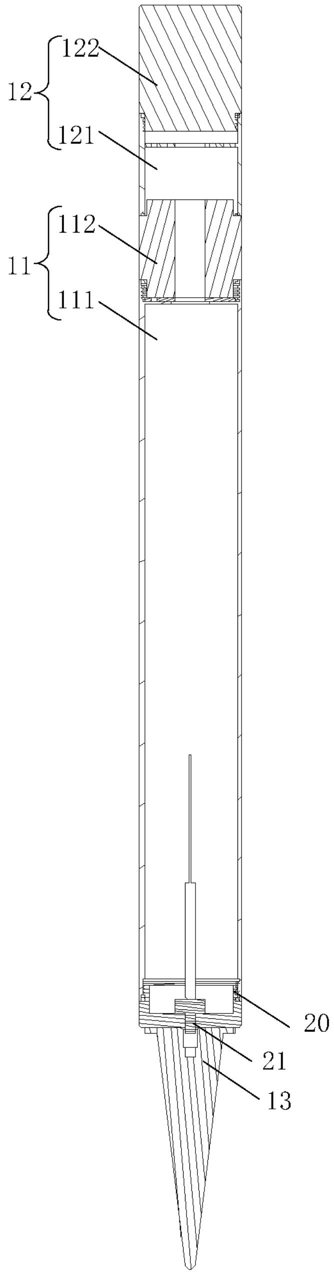
FIG. 3 illustrates a schematic diagram of a cross-sectional view along AA of the lighting lamp in FIG. 1.
Figure 4:
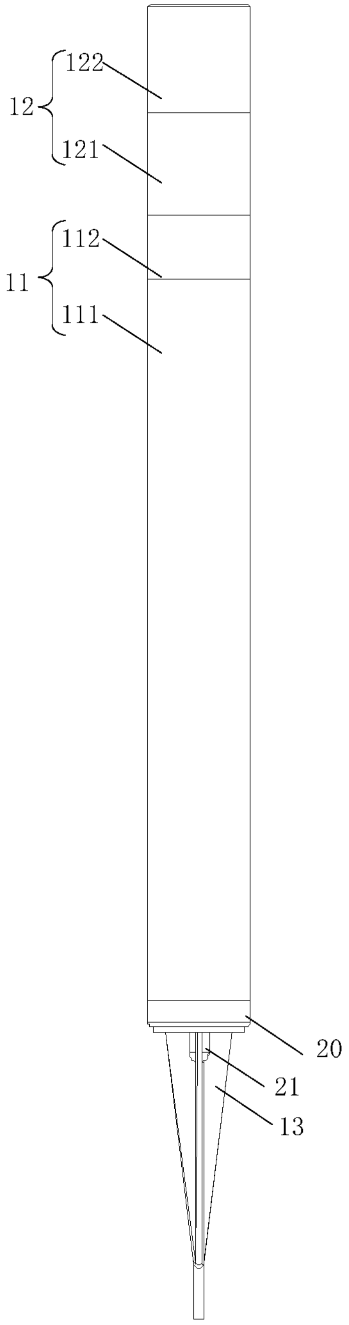
FIG. 4 illustrates a schematic diagram of a side view of the lighting lamp in FIG. 1.
Figure 5:
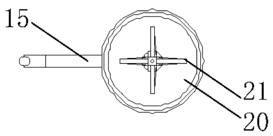
FIG. 5 illustrates a schematic diagram of a top view of the lighting lamp in FIG. 1.
Figure 6:
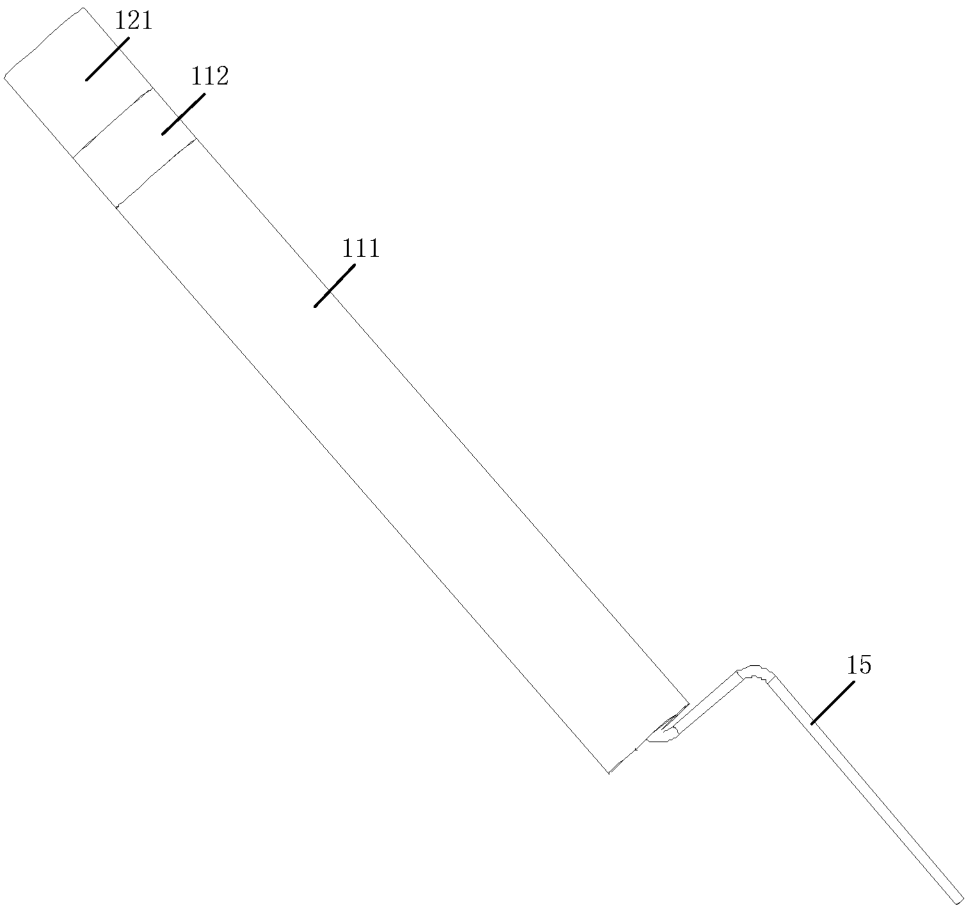
FIG. 6 illustrates a schematic diagram of an assembly structure of the first lamp body, the first lamp column, the second lamp body, the control structure, the first wire, the second wire, and the third wire in FIG. 1.
Figure 7:
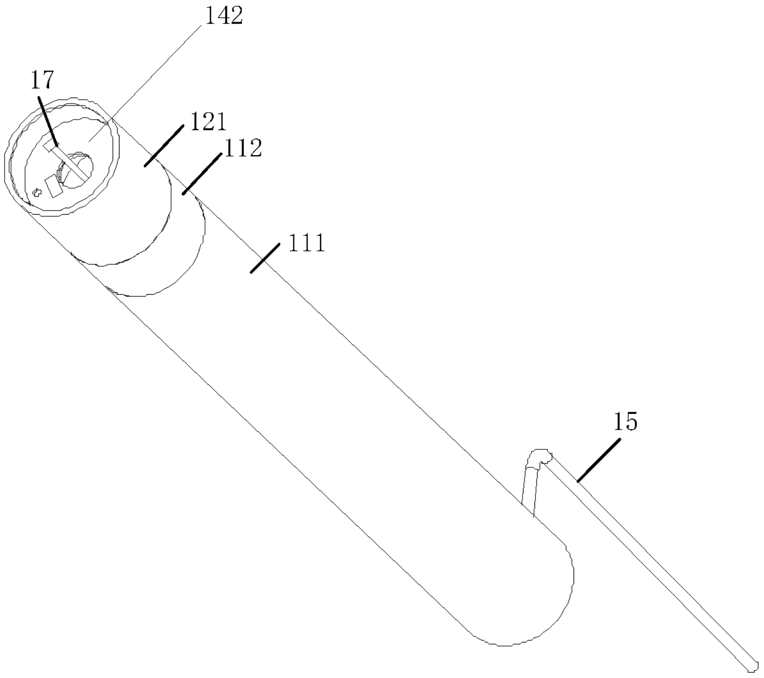
FIG. 7 illustrates a schematic diagram of a side view of light lamp in FIG. 6.
Figure 8:
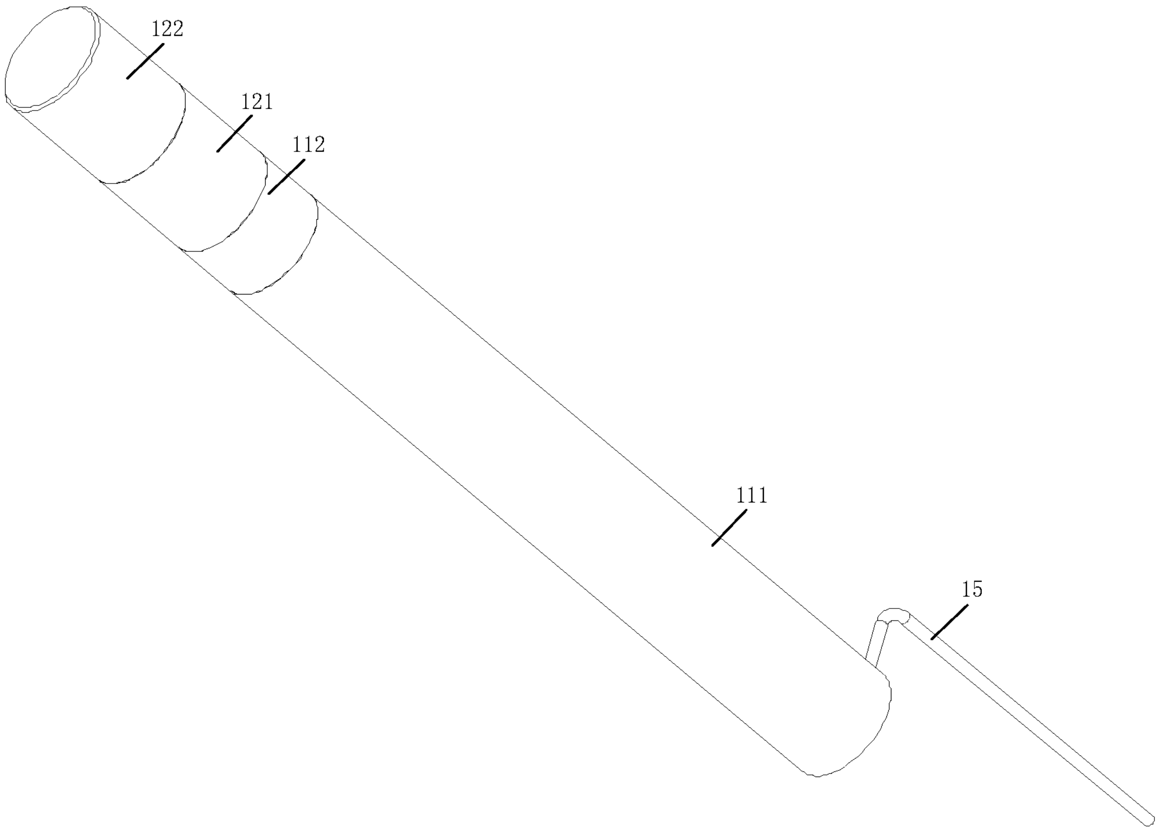
FIG. 8 illustrates a schematic diagram of an assembly structure of the first lamp body, the first lamp column, the second lamp body, the second lamp column, the control structure, the first wire, the second wire, and the third wire in FIG. 1.
Figure 9:
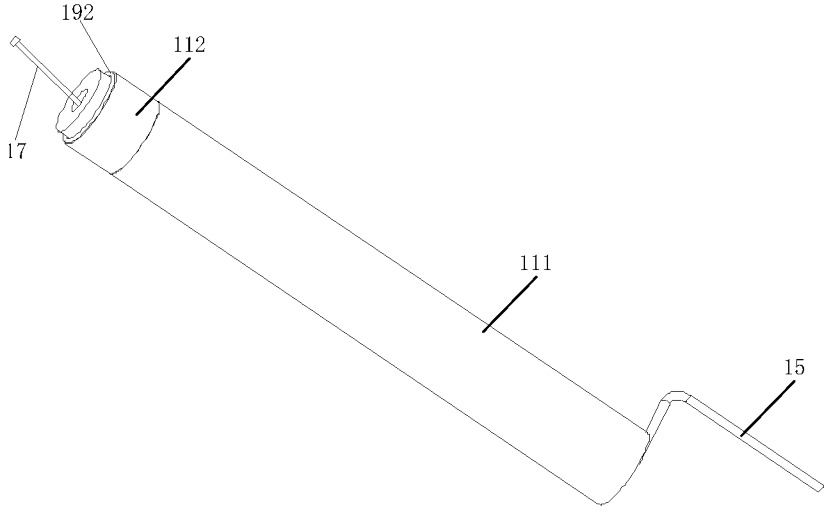
FIG. 9 illustrates a schematic diagram of an assembly structure of the first lamp body, the first lamp column, the second sealing member, the control structure, the first wire, the second wire, and the third wire in FIG. 1.
Figure 10:
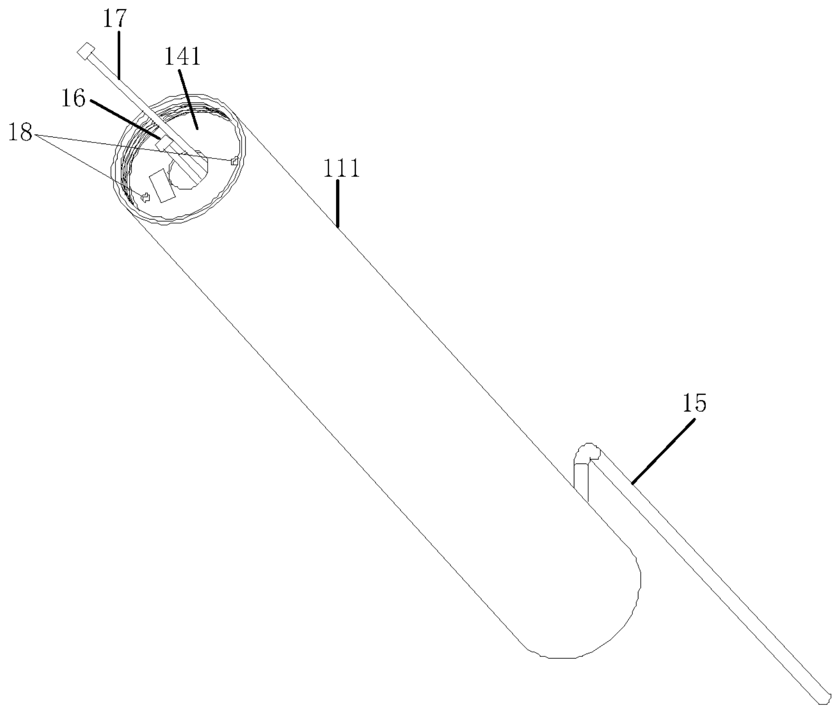
FIG. 10 illustrates a schematic diagram of an assembly structure of the first lamp body, the first control member, the first wire, the second wire, and the third wire in FIG. 1.
Figure 11:
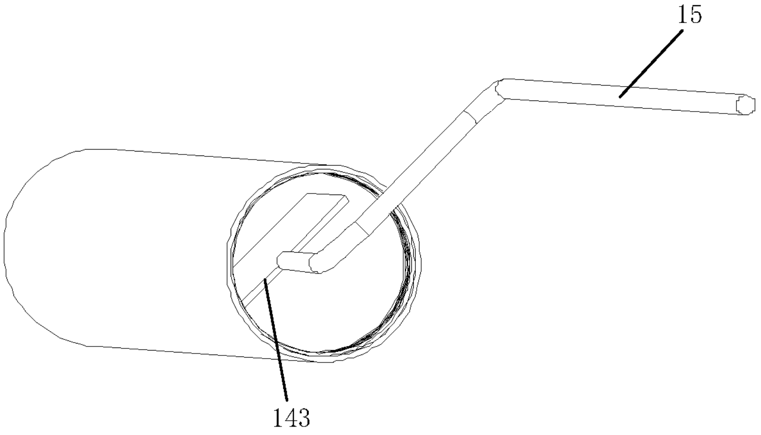
FIG. 11 illustrates a schematic diagram of a side view of the lighting lamp in FIG. 10.
Figure 12:
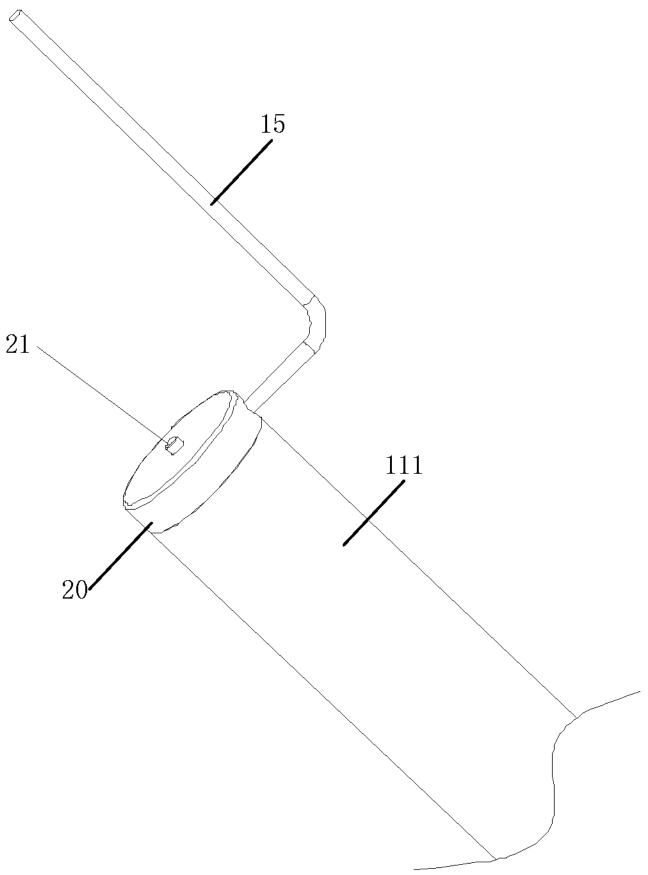
FIG. 12 illustrates a schematic diagram of an assembly structure of the first lamp body, the cover body, and the control structure in FIG. 1.
Figure 13:
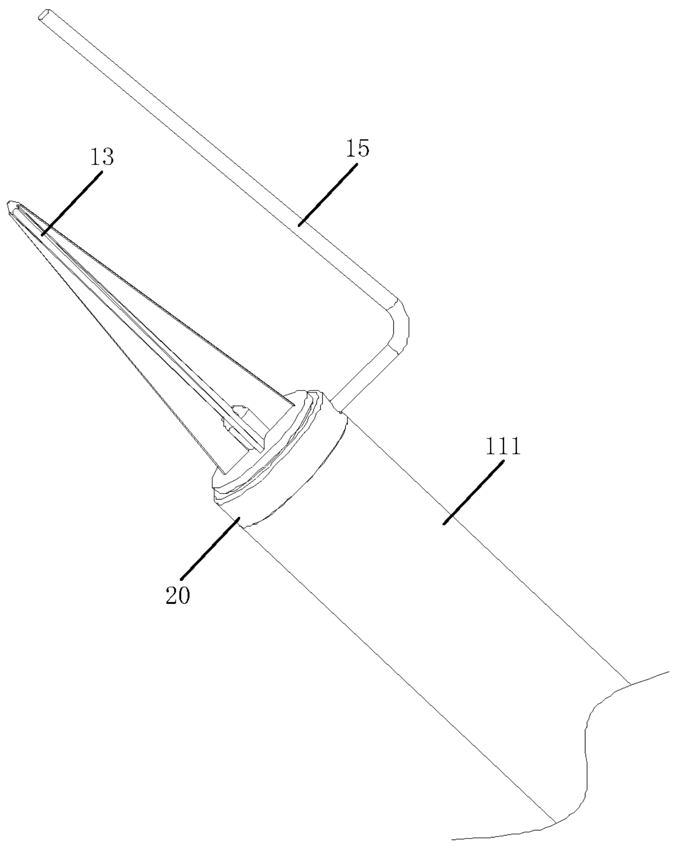
FIG. 13 illustrates a schematic diagram of an assembly structure of the first lamp body, the cover body, the fixing member, and the control structure in FIG. 1.
Figure 14:
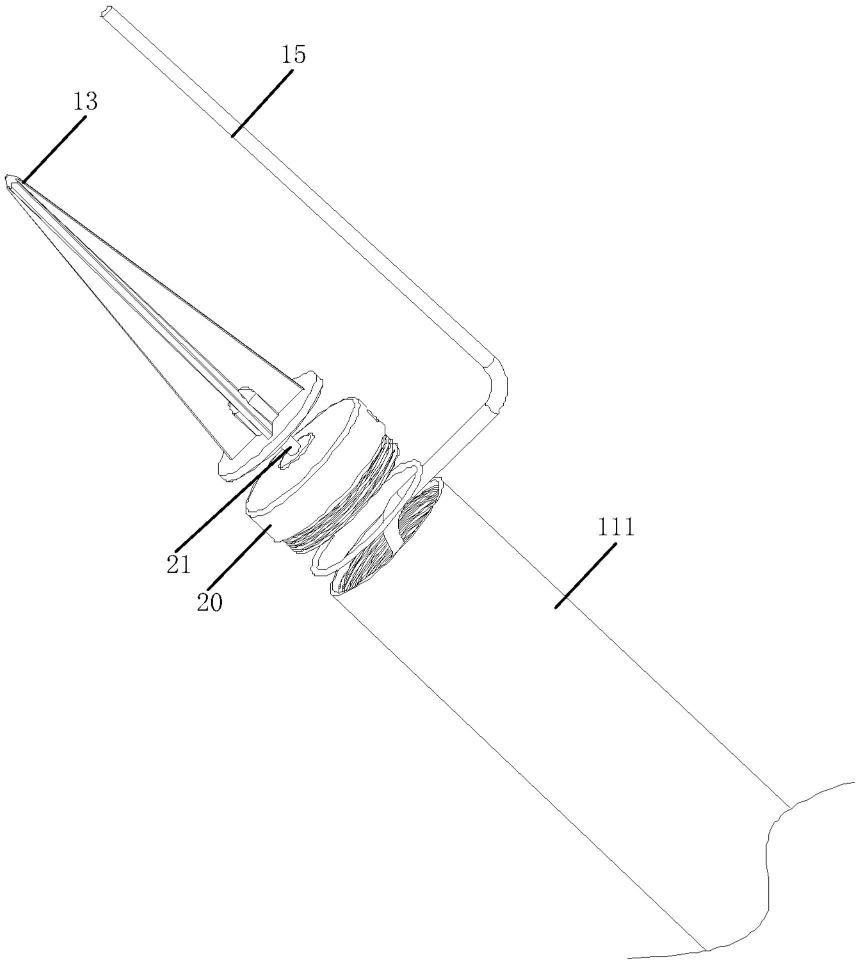
FIG. 14 illustrates a schematic diagram of an explosive view of the lighting lamp in FIG. 13.

Optionally, as shown in FIG. 2 and FIG. 9, the lighting lamp may further include a first sealing member 191, a second sealing member 192, a third sealing member 193 and a fourth sealing member 194. The first sealing member 191 is arranged between the first end of the first lamp body 111 and the fixing member 13; the second sealing member 192 is arranged between the second end of the first lamp body 111 and the first lamp column 112; the third sealing member 193 is disposed between the second end of the first lamp column 112 and the first end of the second lamp body 121; and the fourth sealing member 194 is disposed between the second end of the second lamp body 121 and the second lamp column 122.

Accordingly, by providing the above-mentioned sealing members, the performance of the lighting lamp, such as waterproofing, can be increased, avoiding damage to its internal structure and ensuring its normal operation. The waterproof level of the lighting lamp can reach IP65.

In certain other embodiments, a single sealing member or several sealing members of the above-mentioned sealing members can be optionally provided. In one embodiment, the sealing element is a sealing ring.

Optionally, the connections between the first lamp body 111 and the first lamp column 112, between the first lamp column 112 and the second lamp body 121, and/or between the second lamp body 121 and the second lamp column 122 are realized by threaded structure(s). Connections by the thread structures not only can increase the sealing performance, but also facilitate disassembly and maintenance. Of course, in certain other embodiments, other detachable structures may also be used instead of the threaded structure.

Optionally, as shown in FIGS. 1 to 5 and FIGS. 13 to 14, the lighting lamp may further include a cover body 20. The cover body 20 is provided with a first end and a second end disposed opposite to each other, the first end of the cover body 20 is fixedly connected to the second end of the first lamp body 111, and the second end of the cover body 20 is fixedly connected to the fixing member 13.

The first end of the cover 20 can be fixedly connected with the second end of the first lamp body 111 through a thread structure; and the first sealing member 191 is provided between the first end of the cover body 20 and the second end of the first lamp body 111.

Further, a wiring hole is provided on the side wall of the cover body 20, and the first wire 15 passes through the wiring hole and extends to the outside of the lighting lamp.

The lighting lamp may further include a ground screw 21 for fixedly connecting the cover body 20 with the fixing member 13.

Optionally, the fixing member 13 is arranged in a cone shape, and the bottom end of the fixing member 13 is fixedly connected with the second end of the first lamp body 111.

Specifically, the bottom end of the fixing member 13 is fixedly connected with the cover body 20. The fixing member 13 may be a ground plug, which is used for inserting the lighting lamp into the ground. The cone shape of the fixing member 13 can improve the convenience and stability of ground insertion.

In an application scenario, the installation or assembly process of the lighting lamp is as follows.

Putting the first circuit board (the driving member) having the first wire, the second wire, and the third wire into the bottom of the first lamp body, ends of the two wires go upwards through the first lamp body, and are fixed inside the first lamp body by the dispensing glue (not limited to dispensing glue, it can also be fixed by slotting inside the first lamp body).

Fixing the second circuit board (the first control member) on the first lamp body by screws, the second wire on the first circuit board is connected to the second circuit board through the connection terminal, and the third wire on the first circuit board continues to pass through the first lamp column.

Putting the second sealing member and the third sealing member at the upper and lower portions of the threads or screw teeth of the first lamp column and, after the third wire passes through the first lamp column, screwing the first lamp column into the first lamp body.

Fixing the third circuit board (the second control member) in the second lamp body, passing the third wire through the inside of the second lamp body to connect with the third circuit board, and then screwing the whole second lamp body into the lamp column.

Putting the fourth sealing member on the second lamp column, and screwing it into the second lamp body.

Inserting the first sealing member into the cover body, passing the first wire through the wire hole of the cover body, applying glue for waterproof, screwing the ground plug screw into the cover body from the inside, with the screw teeth exposed on the outside, and then screwing the cover body into the first lamp body through the screw teeth, and finally screwing the ground plug into the ground plug screw.

In certain other embodiments, the number of the second lamp-assembly structures is at least two, and the second lamp-assembly structures extend sequentially along the axial direction of the first lamp-assembly structure.

Figure 15:
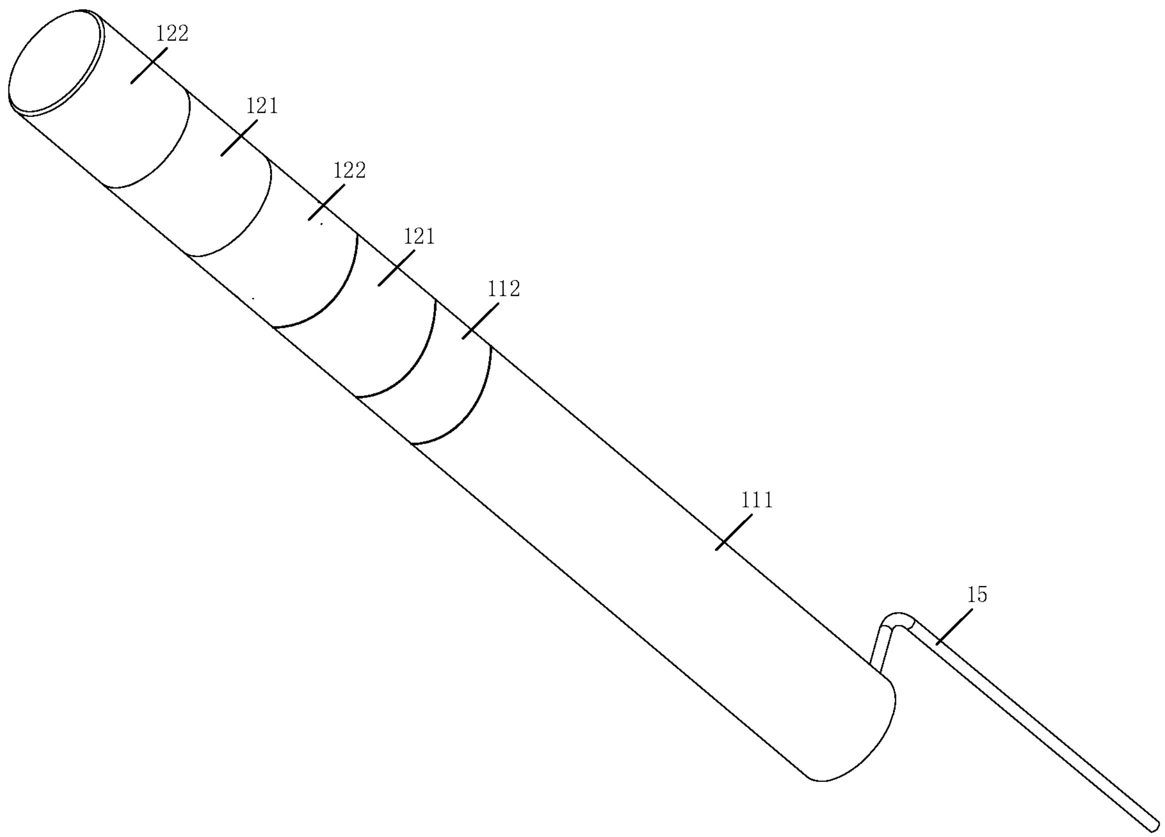
FIG. 15 illustrates a schematic diagram of assembly structure of the first lamp-assembly structure and two second lamp-assembly structures according to an embodiment of the present disclosure.

For example, as shown in FIG. 15, the lighting lamp includes two second lamp-assembly structures extending sequentially along the axial direction of the first lamp-assembly structure. The two second lamp-assembly structures are arranged adjacent to each other, the first end of the second lamp body in the second lamp-assembly structure close to the first lamp-assembly structure is connected to the first end of the first lamp column, and the second end of the second lamp body in the second lamp-assembly structure close to the first lamp-assembly structure is connected to an end of the corresponding second lamp column (the same second lamp-assembly structure). The first end of the second lamp body in the second lamp-assembly structure away from the first lamp-assembly structure is connected with the other end of the second lamp column in the second lamp-assembly structure close to the first lamp-assembly structure.

For another example, a third second lamp-assembly structure can also be stacked on the lighting lamp containing two second lamp-assembly structures, and one end of the second lamp body of the third second lamp-assembly structure is connected to the other end of the second lamp column in the second lamp-assembly structure away from the first lamp-assembly structure.

In certain other embodiments, the second lamp-assembly structure can also be used to make more stacking arrangements, for example, four or more second lamp-assembly structures can be stacked (similar to the above-mentioned stacking arrangement method, directly stacking on the other end of the second lamp column of the second lamp-assembly structure farthest from the first lamp-assembly structure), so that the lamp-assembly structures of the lighting lamp can be expanded in one direction to increase the structure of the lighting lamp and, at the same time, to achieve a variety of lighting effects of the lighting lamp.

Accordingly, the lighting lamp of the present disclosure at least includes a first lamp-assembly structure, a second lamp-assembly structure, and a control structure for controlling the first lamp-assembly structure and the second lamp-assembly structure. The control structure controls the first lamp body and the second lamp body to emit light to achieve the lighting effect of the lighting lamp. The first lamp column is arranged between the first lamp body and the second lamp body, so that the first lamp body and the second lamp body are arranged at an interval, improving the problem of heat concentration between the first lamp body and the second lamp body, improving the heat dissipation effect, thereby improving the luminous efficiency of the first lamp body and the second lamp body, increasing the overall luminous efficiency of the lighting lamp, and improving the lighting effect. In the present disclosure, the first lamp-assembly structure and the second lamp-assembly structure are arranged in layers or stacked, which can increase the complexity of the structure of the lighting lamp and expand the flexibility for expansion, compared with the existing lamps with a single structure.

Further, the first lamp-assembly structure and the second lamp-assembly structure are arranged in layers or stacked, avoiding increasing the diameter of the lighting lamp, that is, the dimension perpendicular to the carrier. Therefore, such arrangements can increase the luminous efficiency of the lighting lamp and improve the lighting effect, under the premise of ensuring the same diameter of the lighting lamp. Further, the light generated by the first lamp body is diffused by the first lamp column, and the light generated by the second lamp body is diffused by the second lamp column, which can improve the uniformity of the light of the lighting lamp and expand the irradiation angle of the light.

The above are merely certain embodiments of the present disclosure, and are not intended to limit the scope of the present disclosure. Any equivalent structure or equivalent process transformation made by using the specification and drawings of the present disclosure, or any directly or indirectly application in other related technologies fields, are all included in the protection scope of this disclosure.

What is claimed is:

1. A lighting lamp, comprising:

a first lamp-assembly structure, at least one second lamp-assembly structure, and a control structure, wherein the first lamp-assembly structure comprises:

a first lamp body configured to generate and emit light and having a first end and a second end arranged opposite to each other; and a first lamp column used to scatter the light generated by the first lamp body as a first light source of the lighting lamp, and having a first end and a second end arranged opposite to each other, wherein the first end of the first lamp column is fixedly connected with the first end of the first lamp body such that the first lamp column is coupled together with the first lamp body to form the first lamp-assembly, wherein the second lamp-assembly structure comprises:

a second lamp body configured to generate and emit light and having a first end and a second end arranged opposite to each other; and a second lamp column fixedly connected to the second end of the second lamp body, and used to scatter the light generated by the second lamp body as a second light source of the lighting lamp, and having a first end and a second end arranged opposite to each other, wherein the first end of the second lamp column is fixedly connected with the second end of the second lamp body such that the second lamp column is coupled together with the second lamp body to form the second lamp-assembly, wherein the first end of the second lamp body being connected to the second end of the first lamp column such that the first lamp-assembly structure and the second lamp-assembly structure are stacked together to provide the first light source and the second light source of the lighting lamp; and wherein the control structure is arranged in the first lamp body or the second lamp body or both, and is electrically connected with the first lamp body and the second lamp body, and is used to control the first lamp body and the second lamp body to emit light, wherein the lighting lamp further includes:

a cover body having a first end and a second end disposed opposite to each other, the first end of the cover body is fixedly connected with the second end of the first lamp body; and a ground plug fixedly connected to the cover body for inserting the lighting lamp into a ground.

2. The lighting lamp according to claim 1, wherein the control structure comprises:

a first control member, arranged inside the first lamp body and electrically connected to the first lamp body, for controlling the first lamp body to emit light; and a second control member, arranged inside the second lamp body and electrically connected with the second lamp body, for controlling the second lamp body to emit light.

3. The lighting lamp according to claim 2, wherein the control structure further comprises:

a driving member, arranged inside the first lamp body or the second lamp body and electrically connected to the first control member and the second control member, for respectively driving the first control member and the second control member to operate.

4. The lighting lamp according to claim 3, further comprising:

a first wire having a first end embedded in the first lamp body and electrically connected to the driving member, and a second end extending outside the first lamp body, from the second end of the first lamp body, and electrically connected to a power supply device;

a second wire arranged in the first lamp body and having a first end electrically connected to the driving member, and a second end electrically connected to the first control member; and a third wire having a first end arranged in the first lamp body and electrically connected to the driving member, and a second end extending to the second lamp body, from the first lamp body, and electrically connected to the second control member.

5. The lighting lamp according to claim 1, wherein:

the ground plug is in a cone shape.

6. The lighting lamp according to claim 5, further comprising one or more of:

a first sealing member disposed between the first end of the first lamp body and the ground plug;

a second sealing member disposed between the second end of the first lamp body and the first lamp column;

a third sealing member disposed between the second end of the first lamp column and the first end of the second lamp body; and a fourth sealing member disposed between the second end of the second lamp body and the second lamp column.

7. The lighting lamp according to claim 1, wherein the first lamp body, the first lamp column, the second lamp body, and the second lamp column are coaxially arranged.

8. The lighting lamp according to claim 1, wherein the at least one second lamp-assembly structure includes two or more second lamp-assembly structures sequentially arranged in an axial direction of the first lamp-assembly structure.

9. The lighting lamp according to claim 1, wherein:

at least one of the first lamp column and the second lamp column includes multiple light-emitting surfaces each having a predetermined light-emitting angle.

10. The lighting lamp according to claim 1, wherein:

a length of the first lamp body is substantially larger than a length of the second lamp body.

11. A lighting lamp, comprising:

a first lamp-assembly structure;

a plurality of second lamp-assembly structures arranged adjacent to each other, including a first second lamp-assembly structure and a second second lamp-assembly structure; and a control structure, wherein the first lamp-assembly structure comprises:

a first lamp body configured to generate and emit light and having a first end and a second end arranged opposite to each other; and a first lamp column used to scatter the light generated by the first lamp body as a first light source of the lighting lamp, and having a first end and a second end arranged opposite to each other, wherein the first end of the first lamp column is fixedly connected with the first end of the first lamp body such that the first lamp column is coupled together with the first lamp body to form the first lamp-assembly, wherein each second lamp-assembly structure comprises:

a second lamp body configured to generate and emit light and having a first end and a second end arranged opposite to each other; and a second lamp column having a first end and a second end arranged opposite to each other, fixedly connected to the second end of the second lamp body, and used to scatter the light generated by the second lamp body as another light source of the lighting lamp, wherein the first end of the second lamp column is fixedly connected with the second end of the second lamp body such that the second lamp column is coupled together with the second lamp body to form the second lamp-assembly; and wherein the first end of the second lamp body of the first second lamp-assembly structure is connected to the second end of the first lamp column, the second end of the second lamp column of the first second lamp-assembly structure is connected to the first end of the second lamp body of the second second lamp-assembly structure, and the control structure is electrically connected with the first lamp body and the second lamp body of each of the plurality of second lamp-assembly structures to control the first lamp body and the second lamp body of each of the plurality of second lamp-assembly structures to emit light, wherein the lighting lamp further includes:

a cover body having a first end and a second end disposed opposite to each other, the first end of the cover body is fixedly connected with the second end of the first lamp body; and a ground plug fixedly connected to the cover body for inserting the lighting lamp into a ground.

12. The lighting lamp according to claim 11, wherein the plurality of second lamp-assembly structures further comprises:

a third second lamp-assembly structure arranged adjacent to the second second lamp-assembly structure.

13. The lighting lamp according to claim 12, wherein the plurality of second lamp-assembly structures further comprises:

a fourth second lamp-assembly structure arranged adjacent to the third second lamp-assembly structure.

14. The lighting lamp according to claim 11, wherein the first lamp body, the first lamp column, the second lamp body of each second lamp-assembly structure, and the second lamp column of each second lamp-assembly structure are coaxially arranged.

15. The lighting lamp according to claim 11, wherein:

the ground plug is in a cone shape.

* * * * *